United States Patent
Seshadrinathan et al.

(10) Patent No.: US 9,313,420 B2
(45) Date of Patent: Apr. 12, 2016

(54) INTELLIGENT COMPUTATIONAL IMAGING SYSTEM

(75) Inventors: Kalpana Seshadrinathan, Sunnyvale, CA (US); Sung Hee Park, Stanford, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 13/976,158

(22) PCT Filed: Jan. 18, 2012

(86) PCT No.: PCT/US2012/021660
§ 371 (c)(1),
(2), (4) Date: Mar. 26, 2014

(87) PCT Pub. No.: WO2013/109261
PCT Pub. Date: Jul. 25, 2013

(65) Prior Publication Data
US 2014/0240549 A1 Aug. 28, 2014

(51) Int. Cl.
| | |
|---|---|
| H04N 5/265 | (2006.01) |
| H04N 5/235 | (2006.01) |
| H04N 5/355 | (2011.01) |
| H04N 9/04 | (2006.01) |

(52) U.S. Cl.
CPC .............. *H04N 5/265* (2013.01); *H04N 5/2353* (2013.01); *H04N 5/2355* (2013.01); *H04N 5/35581* (2013.01); *H04N 9/045* (2013.01)

(58) Field of Classification Search
None
See application file for complete search history.

(56) References Cited

U.S. PATENT DOCUMENTS

| | | | |
|---|---|---|---|
| 6,683,996 B1 * | 1/2004 | Walmsley | B41J 2/04528 345/649 |
| 7,061,524 B2 * | 6/2006 | Liu | H04N 5/23248 348/208.1 |
| 2002/0075399 A1 | 6/2002 | Nemiroff et al. | |
| 2010/0053357 A1 | 3/2010 | Ikeda | |
| 2010/0129000 A1 * | 5/2010 | Strom | G06T 9/00 382/253 |
| 2011/0043604 A1 | 2/2011 | Peleg et al. | |

(Continued)

FOREIGN PATENT DOCUMENTS

| | | |
|---|---|---|
| KR | 10-2011-0073474 A | 6/2011 |
| WO | 2010/024925 A1 | 3/2010 |
| WO | 2013/109261 A1 | 7/2013 |

OTHER PUBLICATIONS

Hasinoff et al., "Noise-Optimal Capture for High Dynamic Range Photography", Proc.23rd IEEE Conference on Computer Vision and Pattern Recognition, 2010, pp. 553-560.

(Continued)

*Primary Examiner* — Twyler Haskins
*Assistant Examiner* — Angel L Garces-Rivera
(74) *Attorney, Agent, or Firm* — Alpine Technology Law Group LLC

(57) ABSTRACT

In some embodiments, an electronic device, comprises an image capture device and logic to receive a first set of input frames from an image capture device, analyze the first set of input frames to determine whether multi-image processing is to be implemented, and in response to a determination that multi-image processing is to be implemented, determine a number of image frames required to capture a dynamic range of a scene, capture at least the number of image frames, align the number of images and merge the number of images into a merged image. Other embodiments may be described.

21 Claims, 3 Drawing Sheets

(56) References Cited

U.S. PATENT DOCUMENTS

| | | | |
|---|---|---|---|
| 2011/0115980 A1 | 5/2011 | Shmueli et al. | |
| 2011/0193990 A1* | 8/2011 | Pillman | H04N 5/23245 348/229.1 |
| 2011/0304694 A1 | 12/2011 | Nestares et al. | |
| 2012/0218442 A1* | 8/2012 | Jandhyala | G06T 7/20 348/239 |

OTHER PUBLICATIONS

International Preliminary Report on Patentability and Written Opinion received for PCT Patent Application No. PCT/US2012/021660, mailed on Jul. 31, 2014, 8 Pages.

Tico et al., "Motion-Blur-Free Exposure Fusion", 17th IEEE International Conference on Image Processing, Sep. 26-29, 2010, pp. 3321-3324. (1 page of Abstract only).

Office Action received for Korean Patent Application No. 10-2014-7021608, issued on Jul. 2, 2015.

International Search Report and Written Opinion received for PCT Application No. PCT/US2012/021660, mailed on Oct. 18, 2012, 11 pages.

"Introducing Pro HDR X" Oct. 13, 2014, retrieved from http://www.eyeapps.com/2014/10/13/introducing-pro-hdr-x/.

Notice of Preliminary Rejection received for Korean Patent Application No. 10-2014-7021608, mailed on Jan. 26, 2016, 6 pages including 1 page of English translation.

* cited by examiner

INTELLIGENT COMPUTATIONAL IMAGING SYSTEM

BACKGROUND

The subject matter described herein relates generally to the field of imaging and image processing and more particularly, to systems and methods for acquiring images of high dynamic range scenes or imaging a scene under low light conditions.

Electronic devices such as mobile phones, personal digital assistants, portable computers and the like may comprise a camera to capture digital images. By way of example, a mobile phone may comprise one or more cameras to capture digital images. Electronic devices may be equipped with an image signal processing pipeline to capture images collected by the camera, process the images and store the images in memory and/or display the images.

In some instances the dynamic range of natural scenes may exceed the dynamic range of the camera acquisition system, resulting in loss of detail in the final image in certain regions of an image. Similarly, under low light conditions, camera images may suffer from significant noise that affects the fidelity of scene capture.

Techniques to accommodate dynamic range issues in digital photography include processing image stacks to extend dynamic range or reduce noise, far less attention has been paid to determining optimal ways of acquiring these image stacks. However, much of the work in the literature assumes that the characteristics of the scene is already known, and captures a predetermined number of images that may be more than sufficient. Since the multi-image approach is susceptible to motion between captured images, unnecessarily capturing more frames may result in poorer merging artifacts and require more expensive reconstruction algorithms to handle motion and misalignments between different images. Thus, techniques to select a number of images in an image stack, may find utility in digital photography, especially in resource-constrained systems such as hand-held mobile devices.

BRIEF DESCRIPTION OF THE DRAWINGS

The detailed description is described with reference to the accompanying figures.

DETAILED DESCRIPTION

Described herein are exemplary systems and methods for computational imaging. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

In some embodiments, the subject matter described herein enables an electronic device to be equipped with one or more image capture devices, e.g., cameras, and image processing techniques for computational imaging. The systems and method described herein enable an electronic device to capture and efficiently process multiple images to generate a single image that provides an improved representation of the scene. The image signals may be stored in memory and/or displayed on a display device.

Figure 1:
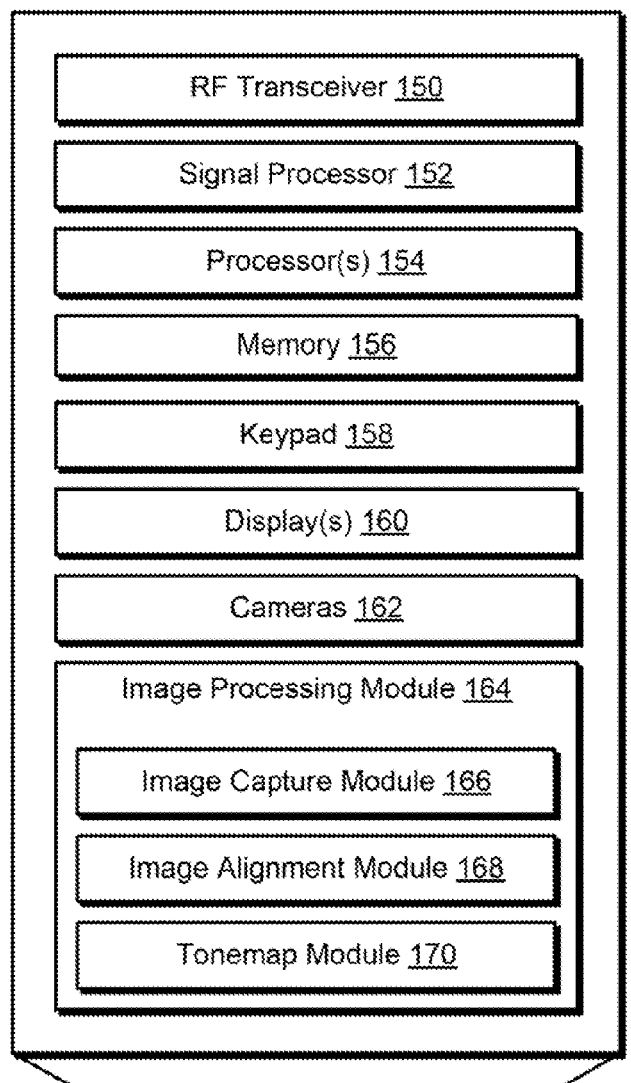
FIG. 1 is a schematic illustration of an electronic device for use in a computational imaging system, according to some embodiments.
Figure 1:
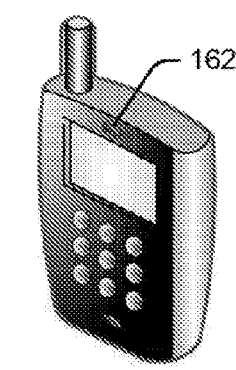

FIG. 1 is a schematic illustration of an electronic device for use in a computational imaging system, according to some embodiments. Referring to FIG. 1, in some embodiments electronic device 110 may be embodied as a mobile telephone, a personal digital assistant (PDA) or the like. Electronic device 110 may include an RF transceiver 150 to transceive RF signals and a signal processing module 152 to process signals received by RF transceiver 150.

RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 110 may further include one or more processors 154 and a memory module 156. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 154 may be one or more processors in the family of Intel®. Also, one or more processors from other manufactures may be utilized. Moreover, the processors may have a single or multi core design. In some embodiments, memory module 156 includes random access memory (RAM); however, memory module 156 may be implemented using other memory types such as dynamic RAM (DRAM), synchronous DRAM (SDRAM), and the like. Electronic device 110 may further include one or more input/output interfaces such as, e.g., a keypad 158 and one or more displays 160.

In some embodiments electronic device 110 comprises two or more cameras 162 and an image signal processing module 164. By way of example and not limitation, a first camera 162 may be positioned on either the front or on the back of electronic device 110. In some embodiments the electronic device 110 may comprise a second or additional cameras. Image signal processing module 164 comprises an image capture module 166, an image alignment module 168, and a tonemap module 170.

Aspects of the image signal processor 164 and the associated image processing pipeline will be explained in greater detail with reference to FIGS. 2-3.

Figure 2:
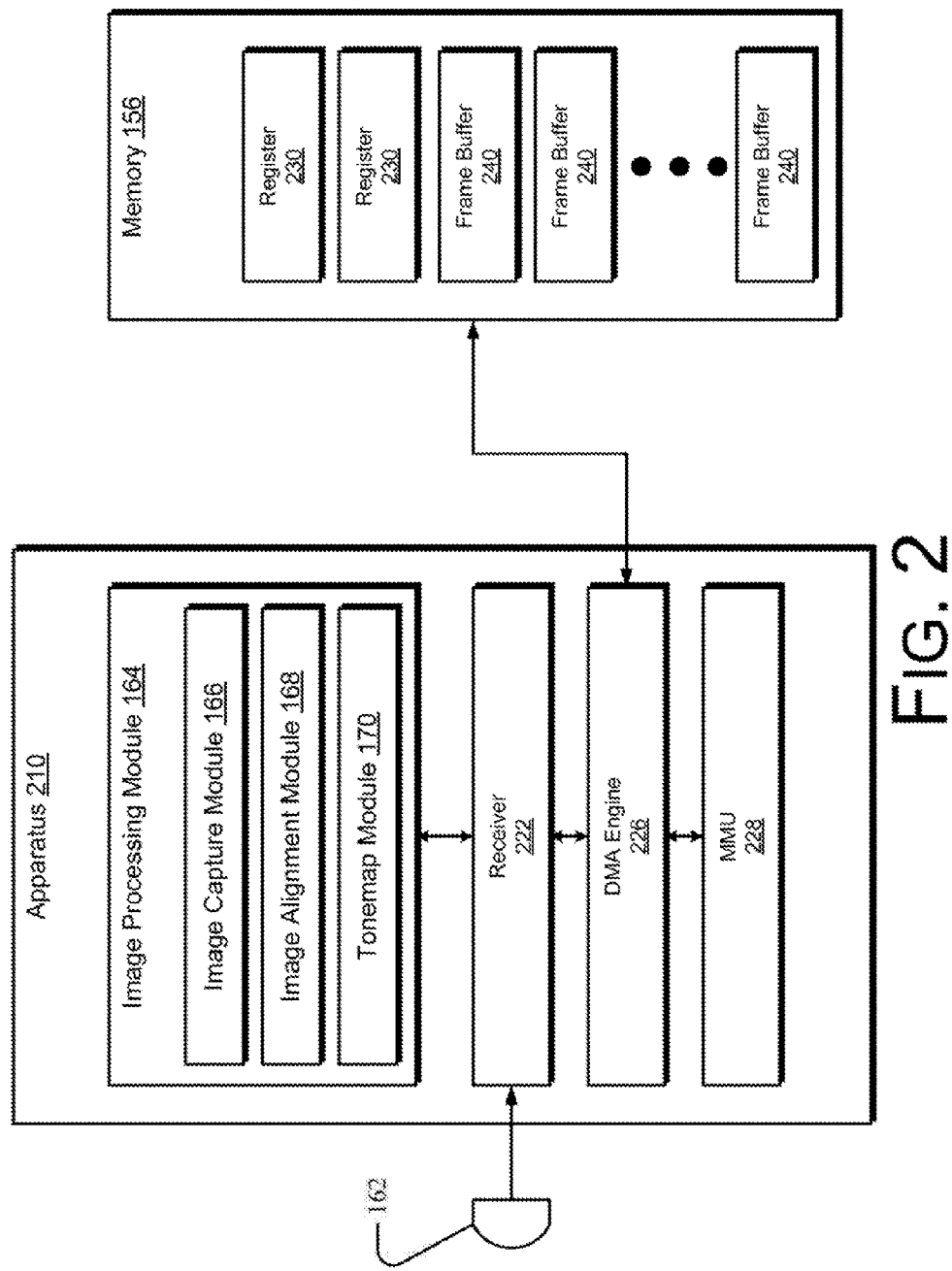
FIG. 2 is a schematic illustration of components of an apparatus for use in a computational imaging system, according to embodiments.
Figure 3:
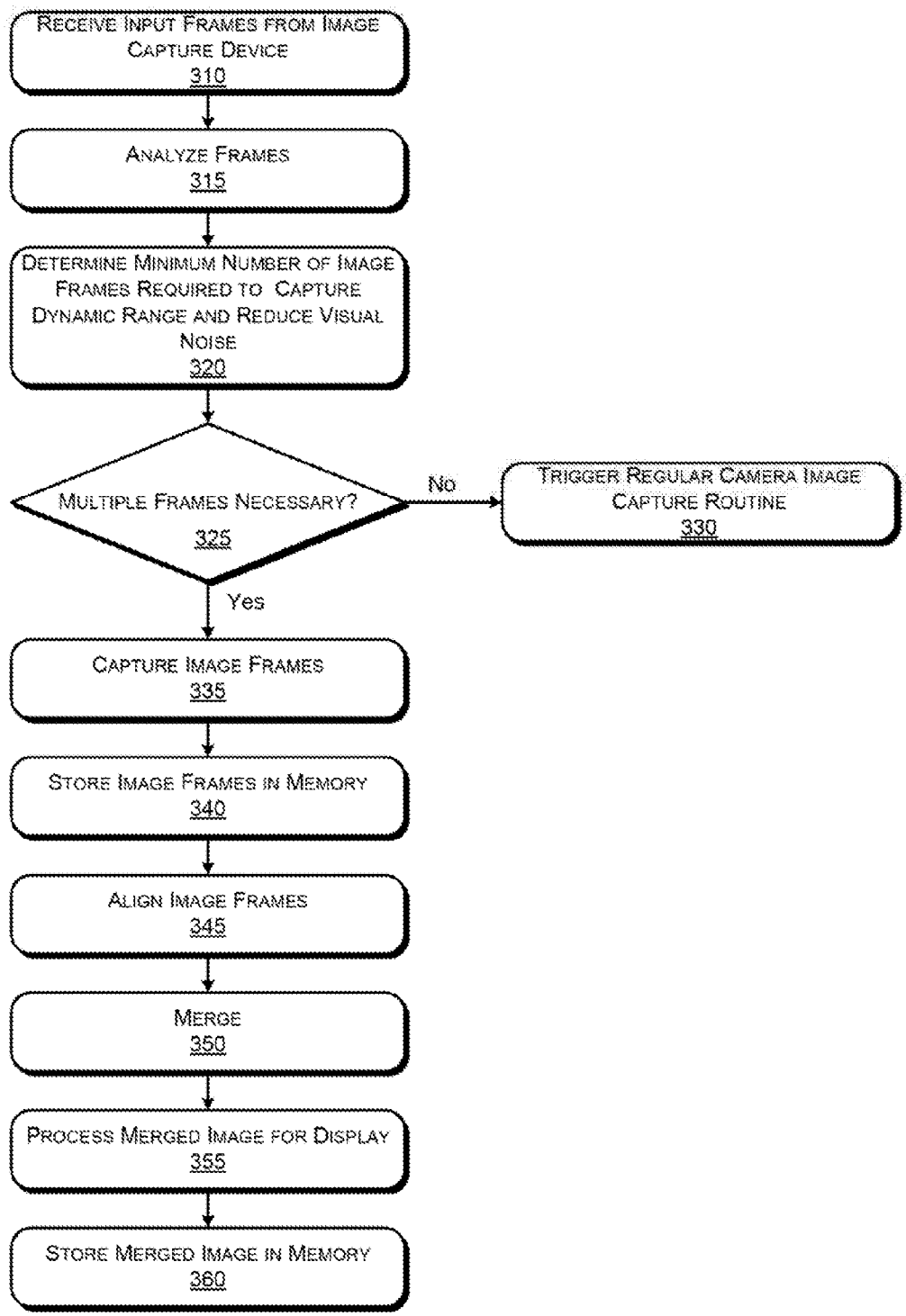
FIG. 3 is a flowchart illustrating in image signal processor multiplexing according to some embodiments.

FIG. 2 is a schematic illustration of components of an apparatus 210 for use in a computational imaging system, according to embodiments. Referring to FIG. 2, in some embodiments an apparatus 210 may be implemented as an integrated circuit or a component thereof, as a chipset, or as a module within a System On a Chip (SOC). In alternate embodiments the apparatus 210 may be implemented as logic encoded in a programmable device, e.g., a field programmable gate array (FPGA) or as logic instructions on a general purpose processor, or logic instructions on special processors such a Digital Signal Processor (DSP) or Single Instruction Multiple Data (SIMD) Vector Processors In the embodiment depicted in FIG. 2, the apparatus 210 comprises an image signal processing (ISP) module 164, which in turn comprises an image capture module 166, an image alignment module 168, and a tonemap module 170, as described above. Apparatus 210 may further comprise a receiver 222, a direct memory access (DMA) engine 226 and a memory management unit (MMU) 228. ISP module 164 is coupled to a memory module 156. Memory module 156 may maintain one or more registers 230 and one or more frame buffers 240.

Operations of the electronic device will be explained with reference to FIGS. 2-3. In some embodiment images from a scene taken by camera 162 are input into a receiver 222 (operation 310). In some embodiments camera 162 may comprise an optics arrangement, e.g., one or more lenses, coupled to an image capture device, e.g., a charge coupled device (CCD). The output of the charge coupled device may be in the format of a Bayer frame. The Bayer frames output from the CCD or CMOS device may be sampled in time to produce a series of Bayer frames, which are directed into one or more receivers 222. These unprocessed image frames may sometimes be referred to herein as raw image frames. One skilled in the art will recognize that the raw image frames may be embodied as an array or matrix of data values. The raw frames may be stored in frame buffers 240. In some embodiments the direct memory access engine 226 retrieves the image frame from receiver 222 and stores the image frame in frame buffer 240.

At operation 315 one or more raw image frames of a scene are analyzed to determine whether multiple raw images of the scene should be processed in order to capture the full dynamic range of the scene, while minimizing visual noise in the image. By way of example in some embodiments the image capture module 166 determines (operation 320) a minimum number of image frames and the corresponding capture parameters (e.g., exposure time and ISO settings) for each of these image frames that are necessary to capture the scene. The criterion used to measure capture fidelity may include the average signal-to-noise ratio (SNR) of the image, which in turn is estimated based on a camera noise model.

In some embodiments one or more raw images are analyzed to compute scene statistics that include the dynamic range and histogram of the scene, which may exceed the dynamic range of the sensor. Along with analysis of the sensor model of the system, these statistics may be used to automatically determine exposure parameters that maximize overall SNR or other objectives that the user designed. Parameters may be set in real-time, so that all estimated exposure parameters can be immediately applied when the user presses the shutter button.

Digital camera sensors are susceptible to different noise sources such as dark current, photon shot noise, readout noise and noise from analog to digital conversion (ADC). In some embodiments a noise model may be applied to model errors introduced from such noise sources.

By way of example, if $I_j$ denote the number of electrons generated at a pixel site j on the sensor per unit time, which is proportional to the incident spectral irradiance, resulting in $I_j$ electrons generated over an exposure time t. The pixel value $X_j$ may be modeled as a normal random variable:

$$X_j = (S_j + R)\alpha g + Q \qquad \text{EQ. 1}$$

$$S_j \sim N(I_j t + \mu_{DC} I_j t + \mu_{DC}) \qquad \text{EQ. 2}$$

$$R \sim N(\mu_R, \sigma^2_R), Q \sim N(\mu_Q, \sigma^2_Q) \qquad \text{EQ. 3}$$

In which $N(\mu, \sigma^2)$ represents the normal distribution with mean $\mu$, and variance $\sigma^2$. $S_j$ is a random variable denoting the number of electrons collected at pixel site j, which is typically modeled using a Poisson distribution whose mean is determined by the number of electrons generated and the dark current $\mu_{DC}$. The Poisson distribution may be approximated using a normal distribution, which is reasonable for a large number of electrons, $\mu_{DC}$ represents the dark current at the sensor site. The dark current depends on the exposure time and the temperature of the sensor. However, in some embodiments it may be appropriate to assume a constant value estimated using typical exposure times for outdoor photography. R denotes the readout noise and Q denotes the noise from the analog-to-digital converter (ADC), both of which may be modeled as Gaussian random variables in Equation 3. The variable g denotes the explicit ISO setting applied to the sensor and a denotes the combined gain of the camera circuitry and the analog amplifier in units of digital number per electron.

The square of the signal-to-noise ratio (SNR) is defined as:

$$SNR(I_j, t, g)^2 = \frac{(I_j t \alpha g)^2}{(I_j t + \mu_{DC} + \sigma^2_R)\alpha^2 g^2 + \sigma^2_Q} \qquad \text{EQ 4}$$

Estimation of the model parameters, denoted using $\hat{\mu}_{DC}$, $\hat{\alpha}$, $\hat{\mu}_R$, $\hat{\sigma}^2_R$, $\hat{\mu}_Q$, $\hat{\sigma}^2_Q$ is discussed below. In some embodiments $SNR^2_X$ may to be estimated from the pixel value at site j denoted as $x_j$, as follows:

$$SNR(I_j, t, g)^2 = \frac{[x_j - \hat{\mu}_Q - \hat{\alpha}g(\hat{\mu}_{DC} + \hat{\mu}_R)]^2}{\hat{\alpha}g(x_j - \hat{\mu}_Q - \hat{\alpha}g\hat{\mu}_R) + \hat{\alpha}^2 g^2 \hat{\sigma}^2_R + \hat{\sigma}^2_Q} \qquad \text{EQ. 5}$$

The dynamic range of the scene may be larger than the dynamic range of the image sensor and may be determined using by continuously streaming images from the sensor to determine a short exposure ($t_{min}$, $g_{min}$) that represents the bright regions of the scene and a long exposure ($t_{max}$, $g_{max}$) that represents dark regions of the scene. Let H represent the histogram of the image streaming from the sensor which is computed in the range [$h_{min}$, $h_{max}$], which is determined by the bit depth of the sensor. The parameters ($t_{min}$, $g_{min}$) may be defined as the exposure where approximately P1% of the pixels in the image are dark and fall within Q1% of the histogram range. To determine ($t_{min}$, $g_{min}$), an initial exposure of ($t_{ini}$, $g_{ini}$) may be set for the first iteration. The normalized P1-percentile value h'=(h−$h_{min}$)/($h_{max}$−$h_{min}$) of the resulting histogram, where h represents the P1-percentile value, may then be determined. If h' $\notin$ [(P−0.5)/100, (P+0.5)/100], the total exposure, which is the product of the exposure time and gain, may be changed by a factor Q1/(100*h') for the next iteration. This procedure may be continued for a fixed number of iterations or until a convergence criterion is met.

A similar procedure may be used to determine ($t_{max}$, $g_{max}$), which is determined as the exposure where approximately P2% of the pixels in the image are bright and fall above Q2% of the histogram range. Finally, a maximum value for the exposure time, which may be set to 60 ms in some embodiments, may be implemented to prevent motion blur. The total exposure may be modified by increasing the exposure time until this limit is reached, at which point the gain may be increased until it is consistent with the sensor noise model.

The scene histogram may be estimated for I, which is proportional to the incident spectral irradiance from the scene. In some embodiments two raw images $x_{min}$ and $x_{max}$ may be captured, using parameters $(t_{min}, g_{min})$ and $(t_{max}, g_{max})$ described above. Note that $x_{min}$ and $x_{max}$ are two different estimates of I obtained using different exposures and can be used to generate an estimate of I, whose histogram can then be calculated. However, these exposures may not be aligned due to the handheld camera and alignment is a computationally expensive operation. Hence I may be estimated using $x_{min}$ and $x_{max}$ separately and combining the resulting histograms. The histogram of I denoted as $H_I$ is generated by averaging the two histograms within overlapping regions and using the histogram of the available exposure in nonoverlapping regions. Satisfactory results may be obtained by computing the histogram of I using 256 bins in the range $[h_{min}/t_{max} \hat{\alpha} g_{max}, h_{max}/t_{min} \hat{\alpha} g_{max}]$. $\hat{I}$ may be estimated from $x_{min}$ using:

$$\hat{I} = \frac{x_j^{min} - \hat{\mu}_Q - \hat{\alpha} g_{min}(\hat{\mu}_{DC} + \hat{\mu}_R)}{t_{min} \hat{\alpha} g_{min}} \quad \text{EQ 6}$$

It is assumed that the histogram constructed using the two frames $x_{min}$ and $x_{max}$ provides a reasonable approximation to the histogram of I. This assumption may be violated for scenes with extremely high dynamic ranges that exceed twice the usable dynamic range of the sensor. In practice, most scenes do not violate this assumption for 10- or 12-bit raw images that typical image sensors provide. Violation of this assumption will result in inaccuracies in the intermediate ranges of the scene histogram.

Having estimated $H_I(l)$, $l \in [h_{min}/t_{max} \hat{\alpha} g_{max}, h_{max}/t_{min} \hat{\alpha} g_{min}]$ a joint optimization may be performed for the number of shots and the exposures of each shot using:

$$\operatorname{argmax}_{N,(t1,g1 \ldots tN,gN)} \sum_{K=1}^{N} \sum_{l} H(l) SNR(l, t_k, g_k)^2 \text{ subject to} \quad \text{EQ. 7A}$$

$$\sum_{l: \sum_{K=1}^{N} SNR(l,t_k,g_k)^2 > T} H_I(l) > \beta \sum_{l} H_I(l) \quad \text{EQ. 7B}$$

Equations 7A and 7B we express the SNR of a merged shot as the sum of the individual SNR's. Further, more than a fraction β of pixels need to be above a threshold of T dB in SNR.

Due to difficulty in solving this optimization analytically, an iterative procedure may be implemented to perform it. The number of shots may be initialized to 1 and the corresponding parameters to $(t1=t_{max}, g_1=g_{max})$ A coarse search may be performed about the total exposure value by multiplying it with factors of (1/8, 1/4, 1/2, 2, 4, 8) to determine the value that maximizes Eq. 7A. A fine search may then be performed around this maximum value by repeatedly multiplying with $2^{0.25}$ until a local maximum is determined. The condition may then be tested to determine whether Eq. (7) is satisfied. If it is not, another shot may be added to the optimization and repeat the above procedure for each shot. For N=2, the initial conditions may be chosen to be $(t_1=t_{max}, g_1=g_{max})$, $(t+=t_{max}, g_2=g_{max})$. For N=3, the initial conditions may be chosen as $(t_1=t_{max}, g_1=g_{max})$, $(t_2=\sqrt{t_{min}t_{max}}, g_2=\sqrt{g_{min}g_{max}})$, $(t_3=t_{min}, g_3=g_{min})$. In some embodiments a maximum exposure time of 60 ms may be estimated to avoid motion blur and the total exposure is modified by increasing the exposure time until this limit is reached, beyond which the ISO gain is increased.

This section describes an estimation procedure for the different parameters of the noise model. First, a number of raw (Bayer domain) dark frames D(k) may be captured by completely covering the lens of the camera using all the different ISO settings g(k) permitted by the image sensor. Here, i ranges over the permitted ISO settings and many mobile cameras allow 16 or 32 different settings. The exposure time for dark frame acquisition may be set at t0=1/30 s, which is approximately the upper limit of typical exposure times used in outdoor photography. The sample mean $\mu_D(k)$ and variance $\hat{\sigma}_D^2(k)$ of each of the dark frames may then be computed. Setting I=0 for dark frames in Eq. (1), it is straightforward to see that:

$$\mu_D(k) = (\hat{\mu}_{DC} + \hat{\mu}_R)\hat{\alpha} g(k) + \hat{\mu}_Q \quad \text{EQ. 8}$$

$$\hat{\rho}_D^2(k) = (\hat{\mu}_{DC} + \hat{\sigma}_R^2)\hat{\alpha}^2 g)(k)^2 + \sigma_Q^2 \quad \text{EQ. 9}$$

Eq. (8) may be treated as a linear function of g(k) with two unknown variables $\hat{\mu}_0 = (\hat{\mu}_{DC} + \hat{\mu}_R)\hat{\alpha}$ and $\hat{\mu}_Q$, which may be estimated using least squares estimation. Similarly, the unknown parameters the unknown parameters $\hat{\sigma}_0^2 = (\hat{\mu}_{DC} + \hat{\sigma}_R^2)\hat{\alpha}^2$ and $\hat{\alpha}_Q^2$ in Eq. (9) may be estimated using least squares estimation.

To estimate $\hat{\alpha}$, flat field images may be displayed at different brightness levels on an LCD monitor and image this with the camera sensor using different exposure times and gains in dark ambient conditions. While neutral density filters placed in a uniform light source box or uniform reflectance cards provide more accurate calibration, reasonable flat field images and calibration accuracy can be achieved using this simple method. Let F(k) represent a flat field raw image acquired using an illumination level I(k), exposure time t(k) and ISO setting g(k). Using four different exposure times, four ISO settings and five illumination levels to acquire a set of images.

$$\hat{\mu}_F(k) = [\hat{\mu}_{DC} + \hat{\mu}_R + I(k)t(k)]\hat{\alpha} g(k) + \hat{\mu}_Q \quad \text{EQ. 10}$$

$$\hat{\sigma}_F^2(k) = [\hat{\mu}_{DC} \hat{\sigma}_R^2 I(k)t(k)]\hat{\alpha}^2 g(k)^2 + \hat{\sigma}_R^2 \quad \text{EQ. 11}$$

In some embodiments $\hat{\mu}_F(k)$ and $\hat{\sigma}_F^2(k)$ may be estimated using the sample mean and variance of F(k) in a central region of the frame that suffered from less than 1% of vignetting distortion. Using previously estimated values of $\hat{\mu}_0, \hat{\mu}_Q, \hat{\sigma}_0^2, \hat{\sigma}_Q^2$ a least squares fitting procedure may be used to estimate $\hat{\alpha}$.

If, at operation 325, the analysis determines that multiple image frames are not necessary to capture adequately the full dynamic range of the scene and minimize visual noise in the image; then control passes to operation 330 and a conventional camera image capture routine may be implemented.

By contrast, if at operation 325 the analysis determines that multiple image frames are necessary to adequately capture the full dynamic range of the scene while minimizing visual noise, then control passes to operation 335 and a minimum number of image frames are captured using the determined parameters. By way of example, in some embodiments the image capture module 166 may direct the DMA engine 226 to capture at least the minimum number of image frames from the receiver. At operation 340 the capture image frames are stored in memory, e.g. in one or more of the registers 230 of memory 156.

At operation 345 the acquired images are aligned. In some embodiments the image frames captured with by camera 162 may need to be aligned before further processing to compensate for camera movement during acquisition. In some embodiments a multi-resolution, gradient-based registration algorithm which uses a 3D camera rotation model may be implemented to align image frames. Intensity conservation is achieved normalizing the raw intensities (assumed to be linear) by the exposure time and gain. Combining a small angle approximation with the projective equation and the gradient constraint results in the following linear constraint on the small angles:

$$\omega_x\left[-I_x\frac{xy}{f_2} - I_y\left(f_1 + \frac{y^2}{f_2}\right) + \Delta I\frac{y}{f_2}\right] +$$
$$\omega_y\left[I_x\left(f_1 + \frac{x^2}{f_2}\right) + I_y\frac{xy}{f_2} - \Delta I\frac{x}{f_2}\right] +$$
$$\omega_z\left[\frac{f_1}{f_2}(-I_xy + I_yx)\right] + \left(\frac{f_1}{f_2} - 1\right)(I_xx + I_yy) + \Delta I = 0$$

EQ. 12 where $(\omega_x, \omega_y, \omega_z)$ is the rotation vector, (x,y) are image coordinates, $f_1$ and $f_2$ are the focal lengths, $(I_x, I_y)$ is the spatial gradient and $\Delta I$ is the image difference. The rotation vector may be estimated gathering constraints from multiple pixels. In some embodiments a reduced number of 800 to 1000 pixels may be used to reduce processing costs. The resulting overdetermined linear system is solved using a robust M-estimator that minimizes the impact of outlying observations due to model violations (e.g., independently moving objects) and local illumination changes.

Once the alignment between the images has been estimated the images may be warped to a common frame of reference. In some embodiments a backwards interpolation warping method may be implemented which uses directly the raw image frames arranged with one of the possible Bayer patterns. This provides computational savings because the images do not need to be interpolated using any of the available demosaicing techniques; furthermore the merging operation in 350 is applied to the raw warped images instead of on the full RGB images involving X3 more data. More particularly, a shifted linear interpolation method may be implemented. This interpolation method starts pre-processing the image with a separable IIR filter (or its equivalent in 2D) that requires a regular sampling grid. Red (R) and blue (B) channels can be directly processed ignoring the missing samples in the Bayer pattern. For the green (G) channel a proper scanning strategy that provides a regular grid may be achieved using a sampling grid rotated 45 degrees. Next a regular bilinear interpolation with shifted displacements can be directly applied to the R and B channels, while the G channel may be rotated 45 deg to select the nearest neighbors needed for the interpolation.

At operation 350 the aligned image frames are merged into a merged image. In some embodiments merging and processing of the raw images that are acquired using the parameters estimated in the optimization stage of our algorithm described above. Let $\{x(k), k\cdot N\}$ denote the images that are acquired from the sensor using exposure parameters computed during optimization as $\{(t(k), g(k), k\cdot N\}$ respectively. Based on the noise model described in Section 2.1, x(k) corresponds to samples from a Gaussian distribution with mean and variance given by:

$$\mu_j(k) = \alpha g(k)(I_j t(k) + \mu_{DC} + \mu_R) + \mu_Q$$  EQ. 13

$$\sigma_j(k)^2 = \alpha^2 g(k)^2 (I_j t(k) + \mu_{DC} + \sigma_R^2) + \sigma_Q^2$$  EQ. 14

The Poisson shot noise and dark noise in the noise model in Eq. (2) introduces a dependence between the mean and variance of the Gaussian distribution, which makes it difficult to obtain a closed form solution to the maximum likelihood estimation (ML) of I based on x(k). Although iterative procedures can be used for this estimation, in some embodiments the estimate of $\hat{\sigma}_j(k)^2$ may be made using the pixel value to reduce computational cost.

$$\hat{\sigma}(k)^2 = \hat{\alpha} g(k)[x(k) - g(k)\hat{\mu}_0 - \hat{\mu}_Q] + g(k)^2\hat{\sigma}_0^2 + \hat{\sigma}_Q^2$$  EQ. 15

Considering $\mu_j(k)$ as a function of $I_j$, the maximum likelihood (ML) estimate of the HDR scene I is then given by $$I = \sum_{k=1}^{N} \frac{[x_j(k) - g(k)\hat{\mu}_0 - \hat{\mu}_Q]\hat{\alpha}g(k)t(k)/\hat{\sigma}_j(k)^2}{\hat{\alpha}^2 g(k)^2 t(k)^2 / \hat{\sigma}_j(k)^2}$$  EQ. 16

In some embodiments a mechanism to avoid pixels that are saturated while merging may be applied. To do this, the value at which the sensor saturates during calibration may be determined and set the weight to 0 for all four pixels in the Bayer 4-pack if any of them are saturated. This avoids creating color artifacts in sensors where the different color channels saturate at different levels and ensures that the darkest exposure is always used in the merging unless it is below the noise floor to handle the corner case where all exposures are saturated. In some embodiments, the HDR image is stored in 16-bit integer format by linearly rescaling the values in the range $[0, h_{max}/\hat{\alpha} \min_k\{g(k)t(k)\}]$ to this range. The integer representation is necessary in mobile devices for processing of these images in the image signal processor (ISP) and also makes software processing of the HDR images faster.

The HDR image may then be processed using a simple camera pipeline consisting of bilinear demosaicing using nearest neighbor interpolation and tonemapping, followed by SRGB gamma transformation. A global tonemapping method for reasons of computational efficiency and use a sigmoid function to generate the tone curve. Let L(I) denote the luminance of I. The tonemapped image H is then obtained via H=IL(H)/L(I) where:

$$L'_j(H) = \frac{1}{1 + be^{-sL_j(I)}}$$  EQ: 17

$$L_j(H) = \frac{L'_j(H) - L'_{min}(H)}{L'_{max}(H) - L'_{min}(H)}$$  EQ: 18

At operation 355 the merged image may be processed for display on a display device. For example, the merged image may be presented on a display 160 on the electronic device, or a separate display coupled to electronic device 160. And at operation 360 the merged image may be stored in a memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A computer program product comprising logic instructions stored on a non-transitory computer readable medium, which when executed by a processor in an electronic device, configure the processor to implement intelligent computational imaging operations, comprising:
receiving a first set of input frames from an image capture device;
analyzing the first set of input frames to determine whether multi-image processing is to be implemented, and in response to a determination that multi-image processing is to be implemented:
determining a number of image frames to capture a dynamic range of a scene;
capturing at least the number of image frames;
aligning the number of images; and
merging the number of images into a merged image,
wherein determining a minimum number of image frames required to capture a scene comprises:
estimating a signal to noise ratio (SNR) of the first set of input frames;
estimating a dynamic range of the scene;
estimating a histogram of the spectral irradiance captured by the imaging device; and
incrementally increasing a number of image frames in a sample to maximize a sum of SNR of pixels captured.

2. The computer program product of claim 1, further comprising logic instructions stored on a non-transitory computer readable medium, which when executed by a processor in an electronic device, configure the processor to process the merged image for display on a display device.

3. The computer program product of claim 1, further comprising logic instructions stored on a non-transitory computer readable medium, which when executed by a processor in an electronic device, configure the processor to store the merged image in a memory module.

4. The computer program product of claim 1, wherein analyzing the first set of input frames to determine whether multi-image processing is to be implemented comprises determining whether the entire dynamic range of the scene may be captured using a single exposure.

5. The computer program product of claim 1, wherein estimating a dynamic range of the scene comprises:
determining a short exposure that represents bright regions of the scene by iteratively altering an exposure level until a threshold number of pixels fall within a pre-determined histogram range;
determining a long exposure that represents dark regions of the scene by iteratively altering the exposure level of the image until a threshold number of pixels fall within a predetermined histogram range.

6. The computer program product of claim 1, wherein aligning the minimum number of images comprises:
estimating a rotation vector between images; and
warping the images to a common frame of reference.

7. The computer program product of claim 6, wherein warping the images to a common frame of reference comprises applying a backwards interpolation method to the image frames in which red and blue channels are processed directly from the raw image frames, while green channels are interpolated on a grid rotated by 45 degrees.

8. The computer program product of claim 1, wherein merging the minimum number of images into a merged image utilizes maximum likelihood combination.

9. The computer program product of claim 1, further comprising logic instructions stored on a non-transitory computer readable medium, which when executed by a processor in an electronic device, configure the processor to bilinear demosaic and tonemap the merged image.

10. An electronic device, comprising:
an image capture device; and
logic to:
receive a first set of input frames from an image capture device;
analyze the first set of input frames to determine whether multi-image processing is to be implemented, and in response to a determination that multi-image processing is to be implemented:
determine a number of image frames required to capture a dynamic range of a scene;
capture at least the number of image frames;
align the number of images; and
merge the images into a merged image;

estimate a signal to noise ratio (SNR) of the first set of input frames;
estimate a dynamic range of the scene;
estimate a histogram of the spectral irradiance captured by the imaging device; and
incrementally increase a number of image frames in a sample to maximize a sum of SNR of pixels captured.

11. The electronic device of claim 10, further comprising logic to determine whether the entire dynamic range of the scene may be captured using a single exposure.

12. The electronic device of claim 10, further comprising logic to:
determine a short exposure that represents bright regions of the scene;
determine a long exposure that represents dark regions of the scene; and
iteratively increase an exposure level of the image until a threshold number of pixels fall within a predetermined histogram range.

13. The electronic device of claim 10, further comprising logic to:
estimate a rotation vector between images; and
warp the images to a common frame of reference.

14. The electronic device of claim 10, further comprising logic to merge the minimum number of images into a merged image utilizing a maximum likelihood combination.

15. The electronic device of claim 14, further comprising logic to apply a backwards interpolation method to the raw image frames in which red and blue channels are processed directly from the raw image frames, while green channels are interpolated on a grid rotated by 45 degrees.

16. A method, comprising:
receiving a first set of input frames from an image capture device;
analyzing the first set of input frames to determine whether multi-image processing is to be implemented, and in response to a determination that multi-image processing is to be implemented:
determining a number of image frames to capture a dynamic range of a scene;
capturing at least the number of image frames;
aligning the number of images; and
merging the number of images into a merged image,
wherein determining a minimum number of image frames required to capture a scene comprises:
estimating a signal to noise ratio (SNR) of the first set of input frames;
estimating a dynamic range of the scene;
estimating a histogram of the spectral irradiance captured by the imaging device; and
incrementally increasing a number of image frames in a sample to maximize a sum of SNR of pixels captured.

17. The method of claim 16, wherein estimating a dynamic range of the scene comprises:
determining a short exposure that represents bright regions of the scene by iteratively altering an exposure level until a threshold number of pixels fall within a pre-determined histogram range;
determining a long exposure that represents dark regions of the scene by iteratively altering the exposure level of the image until a threshold number of pixels fall within a predetermined histogram range.

18. An apparatus, comprising:
logic to:
receive a first set of input frames from an image capture device;
analyze the first set of input frames to determine whether multi-image processing is to be implemented, and in response to a determination that multi-image processing is to be implemented:
determine a number of image frames required to capture the full dynamic range of a scene;
capture at least the number of image frames;
align the number of images; and
merge the number of images into a merged image;
estimate a signal to noise ratio (SNR) of the first set of input frames;
estimate a dynamic range of the scene;
estimate a histogram of the spectral irradiance captured by the imaging device; and
incrementally increase a number of image frames in a sample to maximize a sum of SNR of pixels captured.

19. The apparatus of claim 18, further comprising logic to process the merged image for display on a display device.

20. The apparatus of claim 18, further comprising logic to store merged image in a memory module.

21. The apparatus of claim 18, further comprising logic to determining whether the entire dynamic range of the scene may be captured with minimal visual noise using a single exposure.

* * * * *